(12) United States Patent
Xia et al.

(10) Patent No.: US 12,088,977 B2
(45) Date of Patent: Sep. 10, 2024

(54) SYSTEMS AND METHODS FOR PREVENTING SERVICE INTERRUPTION WHEN TROUBLESHOOTING A PASSIVE OPTICAL NETWORK

(71) Applicant: Verizon Patent and Licensing Inc., Basking Ridge, NJ (US)

(72) Inventors: Tiejun J. Xia, Richardson, TX (US); Glenn A Wellbrock, Wichita, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 17/808,731

(22) Filed: Jun. 24, 2022

(65) Prior Publication Data
US 2023/0421932 A1 Dec. 28, 2023

(51) Int. Cl.
*H04Q 11/00* (2006.01)

(52) U.S. Cl.
CPC ..... *H04Q 11/0067* (2013.01); *H04Q 11/0071* (2013.01); *H04Q 2011/0009* (2013.01); *H04Q 2011/0075* (2013.01)

(58) Field of Classification Search
CPC ............... H04B 10/075; H04B 10/077; H04B 10/0775; H04B 10/079; H04B 10/0795; H04B 10/07955
See application file for complete search history.

(56) References Cited

U.S. PATENT DOCUMENTS

| | | | | |
|---|---|---|---|---|
| 2008/0239295 A1* | 10/2008 | Xia | ...................... | G02B 6/4289 356/73.1 |
| 2009/0073424 A1* | 3/2009 | Xia | ...................... | G02B 6/2852 356/73.1 |
| 2013/0215417 A1* | 8/2013 | Diestelmans | .......... | G01N 21/59 356/73.1 |
| 2013/0343748 A1* | 12/2013 | Benou | .............. | H04B 10/07957 398/29 |
| 2018/0045605 A1* | 2/2018 | Frigo | .................... | G02B 6/447 |
| 2020/0322050 A1* | 10/2020 | Xia | .................. | H04B 10/07955 |
| 2022/0116109 A1* | 4/2022 | Uematsu | ................. | H04L 69/40 |
| 2022/0352980 A1* | 11/2022 | Hirota | .................... | G01M 11/00 |

\* cited by examiner

*Primary Examiner* — Nathan M Cors

(57) ABSTRACT

A device may comprise a first portion and a second portion. The first portion may comprise a plurality of slots configured to receive a plurality of fiber optic cables. Each fiber optic cable may be received in a respective slot of the plurality of slots. The second portion may comprise a plurality of protruding members configured to bend the plurality of fiber optic cables, received in the first portion, to cause the plurality of fiber optic cables to emit light. The second portion may further comprise the light detection unit. The light detection unit may be configured to determine whether light emitted by a fiber optic cable is detected; and provide an indication regarding a port of the plurality of ports based on determining that the light, emitted by the fiber optic cable, is detected. The fiber optic cable may be connected to the port.

20 Claims, 8 Drawing Sheets

SYSTEMS AND METHODS FOR PREVENTING SERVICE INTERRUPTION WHEN TROUBLESHOOTING A PASSIVE OPTICAL NETWORK

BACKGROUND

A passive optical network may include an optical access network architecture based on a point-to-multipoint optical fiber topology with passive branching points. The optical fiber topology may be referred to as an optical distribution network. A passive optical network may utilize the optical distribution network to provide connectivity between multiple central nodes, known as optical line terminals, and multiple user nodes, known as optical network units.

DETAILED DESCRIPTION OF PREFERRED EMBODIMENTS

Figure 1:
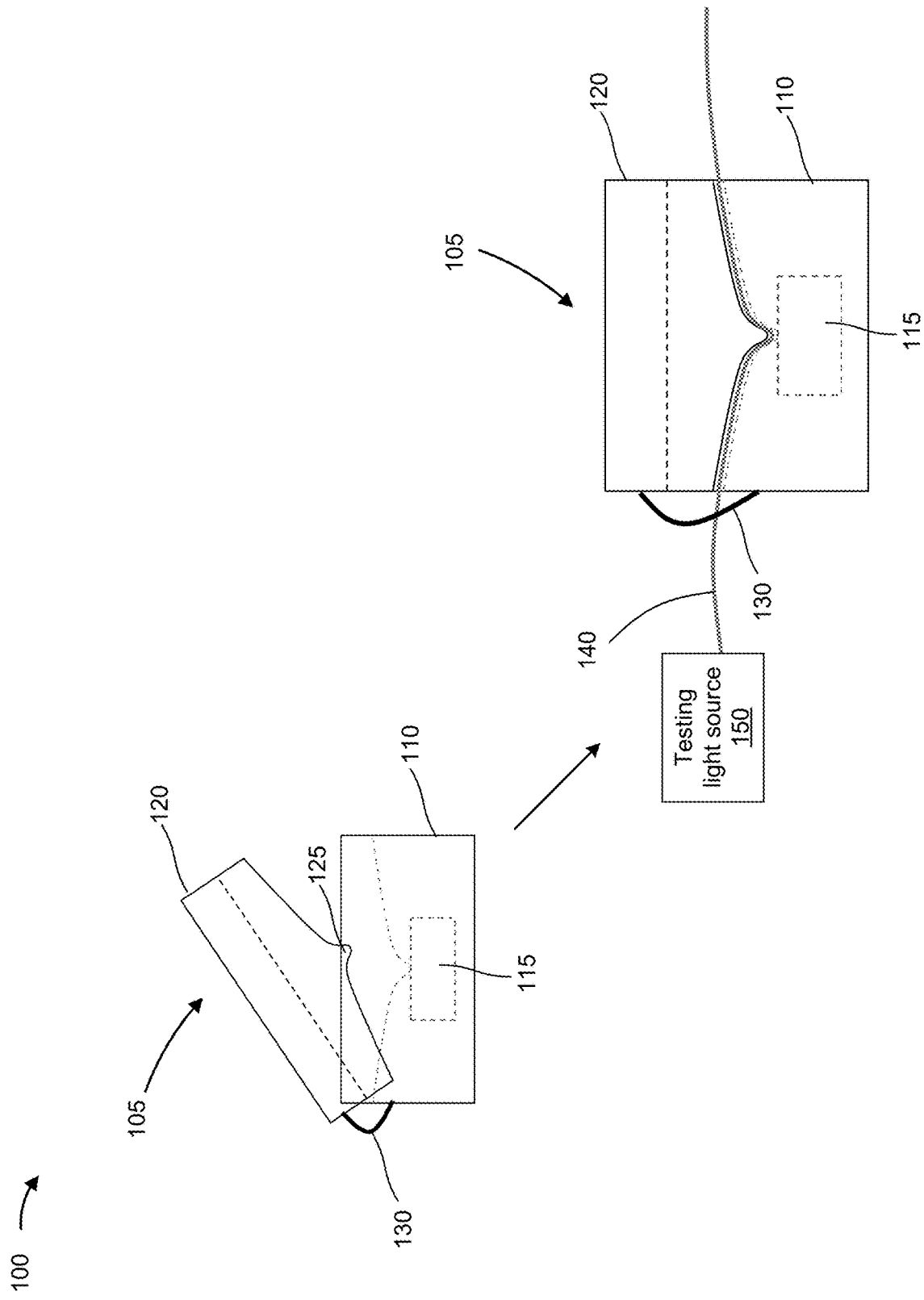
FIG. 1 is a diagram of an example associated with preventing service interruption when troubleshooting a passive optical network (PON).

The following detailed description of example implementations refers to the accompanying drawings. The same reference numbers in different drawings may identify the same or similar elements.

In a passive optical network (PON), a plurality of fiber optic cables are connected to a plurality of ports of a passive power splitter. For example, a first end of each fiber optic cable may be connected to a respective port of the plurality of ports. A second end of each fiber optic cable, of the plurality of fiber optic cables, may be connected to a respective client transceiver of a plurality of client transceivers located at different customer premises. A transceiver, located a central office of a service provider, may broadcast optical signals to the plurality of client transceivers via the passive power splitter.

Typically, each fiber optic cable (at a customer premise) is to be provided with port information identifying a respective port, of the plurality of ports of the passive power splitter, to which the fiber optic cable is connected. The port information identifying the respective port may assist a technician in identifying a port that is experiencing a failure. For example, if a particular client transceiver is experiencing a failure, the technician may use the port information (provided with the fiber optic cable) to identify a particular port, of the plurality of ports of the passive power splitter, to which the particular client transceiver is connected via a particular fiber optic cable. The technician may disconnect the particular fiber optic cable, connected to the particular port, and perform troubleshooting operations on the particular port to attempt to resolve the failure.

Currently, techniques for identifying a port to which a fiber optic cable is connected are subject to errors. For example, the information identifying the particular port, to which the particular fiber optic cable is connected, may identify an incorrect port instead of identifying the particular port to. Accordingly, when attempting to perform the troubleshooting operations, the technician may mistakenly disconnect an incorrect fiber optic cable instead of disconnecting the particular fiber optic cable from the particular port, thereby causing unintended service interruption for a customer associated with the incorrect fiber optic cable. Mistakenly disconnecting an incorrect fiber optic cable may consume network resources, computing resources, and other resources associated with performing extensive troubleshooting for the particular fiber optic cable, for devices associated with the particular fiber optic cable, for the incorrect cable, and/or for devices associated with the incorrect fiber optic cable.

Implementations described herein are directed to accurately identifying a port, of a passive power splitter, that is experiencing a failure. For example, a PON testing device (provided at a location of the passive power splitter) may be configured to receive a plurality of fiber optic cables. Each fiber optic cable may be connected to a respective port of a plurality of ports of the passive power splitter. The plurality of fiber optic cables may be received in a plurality of slots of the PON testing device.

A plurality of protruding members, of the PON testing device, may be configured to bend the plurality of fiber optic cables, in the plurality of slots, to cause the plurality of fiber optic cables to emit light. For example, each protruding member may push down on a respective fiber optic cable, in a respective slot, to bend the respective fiber optic cable and cause the respective fiber optic cable to emit light (e.g., to cause light leakage).

A light detection unit, of the PON testing device, may be configured to determine whether the light, emitted by a particular fiber optic cable of the plurality of fiber optic cables, is a test light. For example, the particular fiber optic cable may be experiencing a failure. Accordingly, a first end of the particular fiber optic cable may be disconnected from a device (at a customer premise) and connected to a testing light source that emits the test light. If the light detection unit detects that the light emitted by the particular fiber optic cable is the test light, the light detection unit may provide an indication of the particular port, of the passive power splitter, to which the particular fiber optic cable is connected.

By using the PON testing device as described herein, a port experiencing a failure may be accurately identified. Accordingly, by accurately identifying the port, implementations described herein may preserve network resources, computing resources, and other resources that would have been consumed by performing extended troubleshooting.

FIG. 1 is a diagram of an example 100 associated with preventing service interruption when troubleshooting a PON. As shown in FIG. 1, example 100 may include a PON testing device 105, a fiber optic cable 140, and a testing light source 150. PON testing device 105 may include a first portion 110, a second portion 120, and a hinge 130 that is configured to connect first portion 110 and second portion 120.

First portion 110 may be configured to receive a plurality of fiber optic cables 140. For example, first portion 110 may include a plurality of slots configured to receive a plurality of fiber optic cables 140, as described below. Each slot may be configured to receive a respective fiber optic cable 140. Each fiber optic cable 140 may be connected to a respective port of a plurality of ports of a passive power splitter.

First portion 110 may further include a light detection unit 115. Light detection unit 115 may be configured to determine whether light emitted by a particular fiber optic cable 140, in a particular slot of the plurality of slots, is detected. Based on determining that light emitted by the particular fiber optic cable 140 is detected, light detection unit 115 may provide an indication regarding a port, of the plurality of ports, to which the fiber optic cable 140 is connected.

In some implementations, when determining whether the light emitted by a particular fiber optic cable 140 is detected, light detection unit 115 may filter light emitted by the plurality of fiber optic cables 140 in the plurality of slots. Light detection unit 115 may determine whether light, emitted by any fiber optic cable 140, is detected after filtering the light emitted by the plurality of fiber optic cables 140.

Second portion 120 may include a plurality of protruding members 125 (collectively "protruding members 125" and individually "protruding member 125"). Each protruding member 125 may be associated with a corresponding slot of the plurality of slots. For example, each protruding member 125 may be received in a corresponding slot of the plurality of slots. For instance, a particular protruding member 125 may be configured to cause the particular fiber optic cable 140, in the particular slot of the plurality of slots, to bend, thereby causing the particular fiber optic cable 140 to emit light (e.g., thereby causing light leakage).

As an example, each protruding member 125 may be configured to push downward on a fiber optic cable 140, in a corresponding slot of the plurality of slots, to cause the fiber optic cable 140 to bend. For instance, the particular protruding member 125 may be configured to push downward on the particular fiber optic cable 140, in the particular slot, to bend the particular fiber optic cable 140, as PON testing device 105 transitions from an open position to a closed position. PON testing device 105 is shown in the closed position in FIG. 1 (bottom right hand side). As shown in FIG. 1, a protruding member 125 is received in a slot with a fiber optic cable 140, thereby causing the fiber optic cable 140 to bend. PON testing device 105 may be configured to receive the plurality of fiber optic cables 140 when PON testing device 105 is the open position.

Testing light source 150 may include one or more devices configured to emit light (e.g., test light). For example, testing light source 150 may be configured to be connected to the particular fiber optic cable 140 for the purpose identifying the particular port, of the plurality of ports of the passive power splitter, to which the particular fiber optic cable 140. For instance, testing light source 150 may be connected to the particular fiber optic cable 140 in the event of a failure indicated by a device, of a customer, previously connected to the particular fiber optic cable 140. For instance, a first end of the particular fiber optic cable 140 may be connected to testing light source 150 and a second end of the particular fiber optic cable 140 may be connected to the particular port.

Testing light source 150 may be configured to emit the test light at a wavelength that is different than wavelengths of an optical band typical used in a PON. In some implementations, wavelengths of optical signals, received from a central office and provided via the particular fiber optic cable 140, may exceed the wavelength of the test light emitted by testing light source 150 (and provided via the particular fiber optic cable 140). The wavelength of the test light may be different in this manner to enable the test light to be easily detected, thereby facilitating the identification of a port experiencing a failure. For example, when determining that the light emitted by the particular fiber optic cable 140 is detected, light detection unit 115 may determine that the light is the test light.

The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example component may perform one or more functions described as being performed by another set of devices of the example component.

Figure 2:
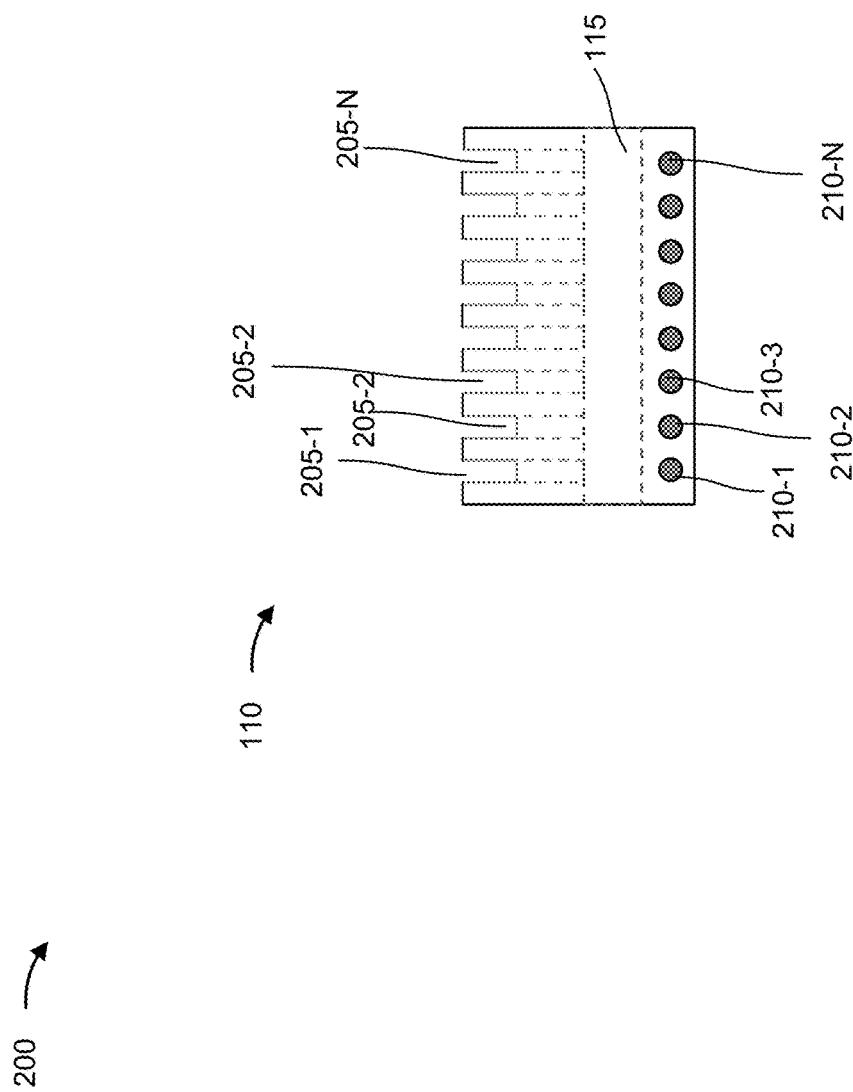
FIG. 2 is a diagram of a side view of a first portion of an example PON testing device described herein.

FIG. 2 is a diagram of a side view 200 of a first portion 110 of the example PON testing device 105 described herein. As shown in FIG. 2, first portion 110 may include light detection unit 115, a plurality of slots 205 (collectively "slots 205" and individually "slot 205"), and a plurality of light emitting devices 210-1 to 210-N (collectively "light emitting devices 210" and individually "light emitting device 210"). As explained in connection with FIG. 1, each slot 205 may be configured to receive a respective fiber optic cable 140.

A light emitting device 210 may include one or more devices configured to emit light. In some examples, light emitting devices 210 may be light emitting diodes. Each light emitting device 210 may be associated with a respective slot 205 of the plurality of slots 205. In this regard, each light emitting device 210 may be configured to provide an indicating regarding a respective slot 205. For example, a particular light emitting device 210 may be associated with a particular slot 205 that has received the particular fiber optic cable 140. In this regard, the particular light emitting device 210 may be configured to emit light of a first color based on light detection unit 115 determining that light emitted by the particular fiber optic cable 140 is detected.

Alternatively, the particular light emitting device 210 may be configured to emit light of a second color (different than the first color) based on light detection unit 115 determining that the light emitted by the particular fiber optic cable 140 is not detected. Alternatively, the particular light emitting device 210 may be configured to not emit light based on light detection unit 115 determining that the light emitted by the particular fiber optic cable 140 is not detected.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
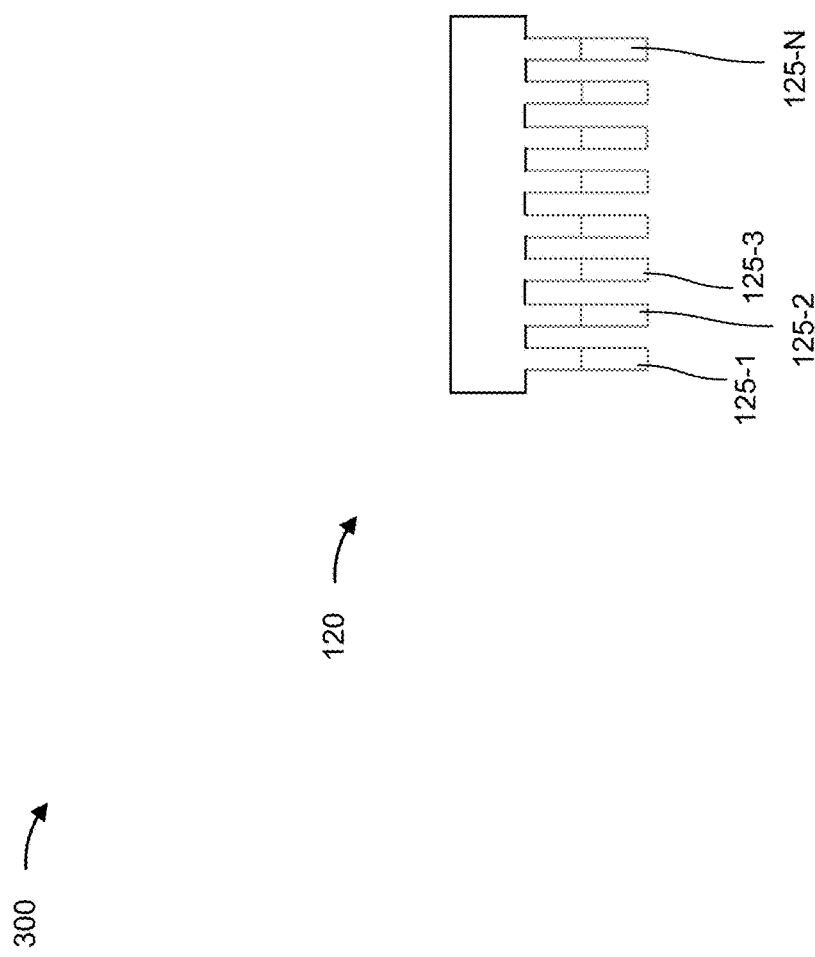
FIG. 3 is a diagram of a side view of a second portion of an example PON testing device described herein.

FIG. 3 is a diagram of a side view 300 of a second portion 120 of an example PON testing device 105 described herein. As shown in FIG. 3, second portion 120 may include a plurality of protruding members 125-1 to 125-N (collectively "protruding members 125" and individually "protruding member 125"). Protruding members 125 have been described above in connection with FIG. 1. As explained herein, each protruding member 125 may be received in a corresponding slot 205.

As indicated above, FIG. 3 is provided as an example. Other examples may differ from what was described in connection with FIG. 3.

Figure 4:
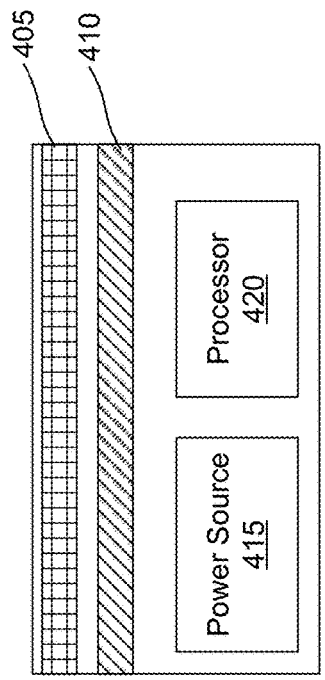
FIG. 4 is a diagram of a light detection unit of an example PON testing device described herein.

FIG. 4 is a diagram of a light detection unit 115 of an example PON testing device 105 described herein. As shown in FIG. 4, light detection unit 115 may include an optical filter 405, a photodetector array 410, a power source 415 (e.g., an electric power source), and a processor 420. Optical filter 405 may be configured to filter light emitted by the plurality of fiber optic cables 140 in the plurality of slots 205. In some examples, optical filter 405 may be configured based on the wavelength of the test light of testing light source 150. Accordingly, optical filter 405 may filter the light emitted by the plurality of fiber optic cables 140 based on the wavelength of the test light. In other words, optical filter 405 may be configured to pass light of the wavelength of the test light and block light of a wavelength that is different than the wavelength of the test light.

In some implementations, photodetector array 410 may be provided below optical filter 405. Photodetector array 410 may include one or more devices configured to generate a signal (e.g., an electrical current) based on detecting light. For example, photodetector array 410 may be configured to detect light passed by optical filter 405 and generate a signal regarding the light. For example, based on optical filter 405 passing the light emitted by the particular fiber optic cable 140, photodetector array 410 may generate a signal indicating that light has been detected via the particular slot 205.

Power source 415 may be configured to provide power to light emitting devices 210 and/or to processor 420. As an example, power source 415 may provide power to light emitting devices 210 to enable light sources to emit light.

Processor 420 may include one or more devices configured to control an operation of light emitting devices 210. For example, processor 420 may be configured to cause light emitting device 210 to emit light of the first color or emit light of the second color. For example, processor 420 may receive a signal from photodetector array 410 and cause a light emitting device 210 to emit light based on the signal. For example, processor 420 may receive the signal indicating that light has been detected via the particular slot 205 and cause a particular light emitting device 210, associated with the particular slot 205, to emit light of the first color.

By causing the particular light emitting device 210 to emit light of the first color as described herein, PON testing device 105 may accurately identify the particular port to which the particular fiber optic cable 140 is connected. By accurately identifying the particular port, implementations described herein may preserve network resources, computing resources, and other resources that would have been consumed by performing extended troubleshooting.

The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the example component may perform one or more functions described as being performed by another set of devices of the example component.

Figure 5:
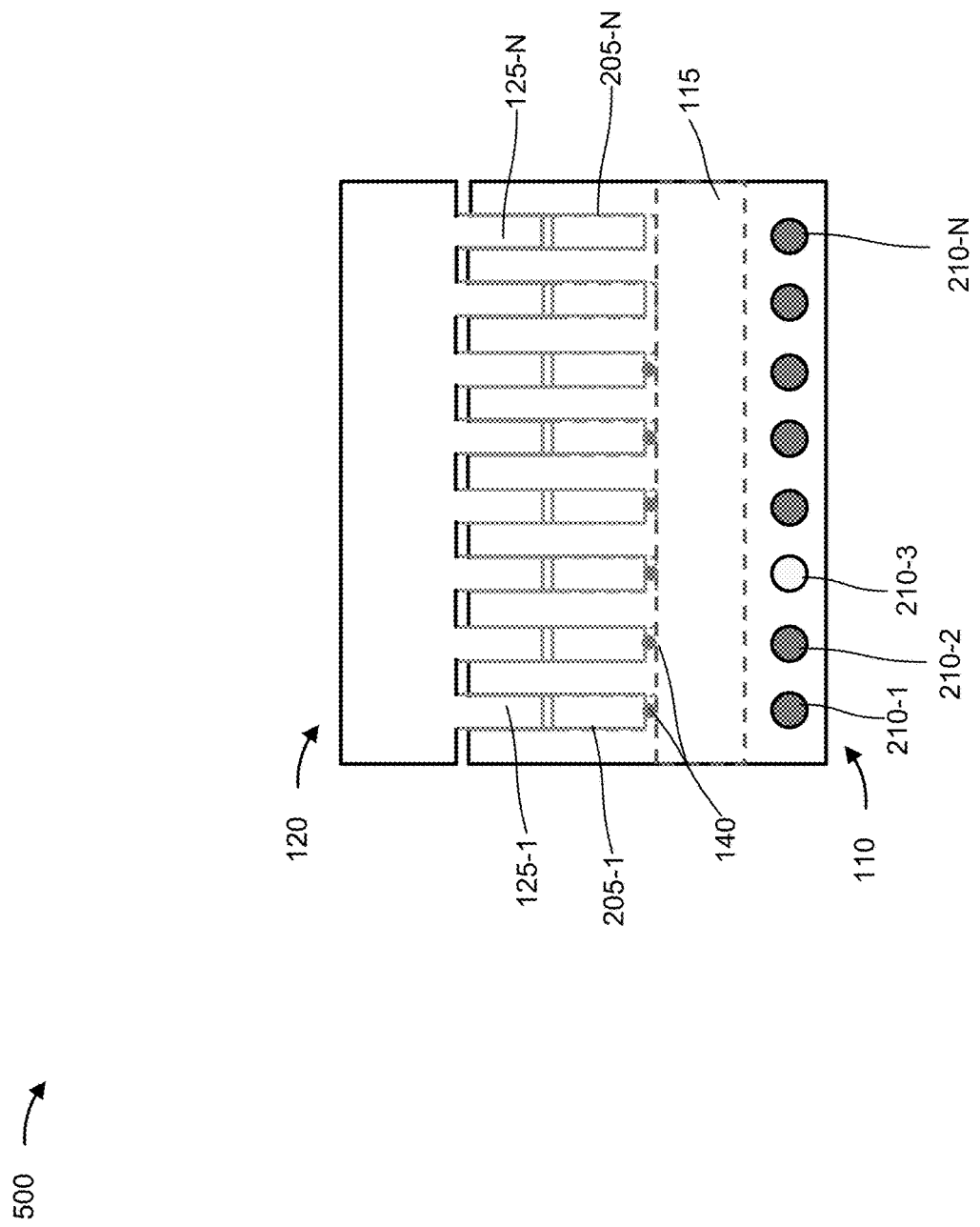
FIG. 5 is a diagram of a side view of an example PON testing device in a closed position described herein.

FIG. 5 is a diagram of a side view 500 of an example PON testing device 105 in a closed position described herein. The elements of PON testing device 105 have been described above in connection with FIGS. 1-3. As shown in FIG. 5, protruding members 125 may be interdigitated with respect to slots 205 when PON testing device 105 is in the closed position. As shown in FIG. 5, multiple slots 205 may receive a corresponding number fiber optic cables 140.

When PON testing device 105 is the closed position, each protruding member 125 may be configured to push downward on a fiber optic cable 140, in a corresponding slot 205 of the plurality of slots 205, to cause the fiber optic cable 140 to bend and emit light. If light, emitted by the fiber optic cable 140 received in a corresponding slot 205, is the test light, a light emitting device 210 (associated with the corresponding slot 205) may emit light of the first color.

By causing the light emitting device 210 to emit light of the first color as described herein, PON testing device 105 may accurately identify the port to which the fiber optic cable 140 is connected. By accurately identifying the particular port, implementations described herein may preserve network resources, computing resources, and other resources that would have been consumed by performing extended troubleshooting.

As indicated above, FIG. 5 is provided as an example. Other examples may differ from what was described in connection with FIG. 5.

Figure 6:
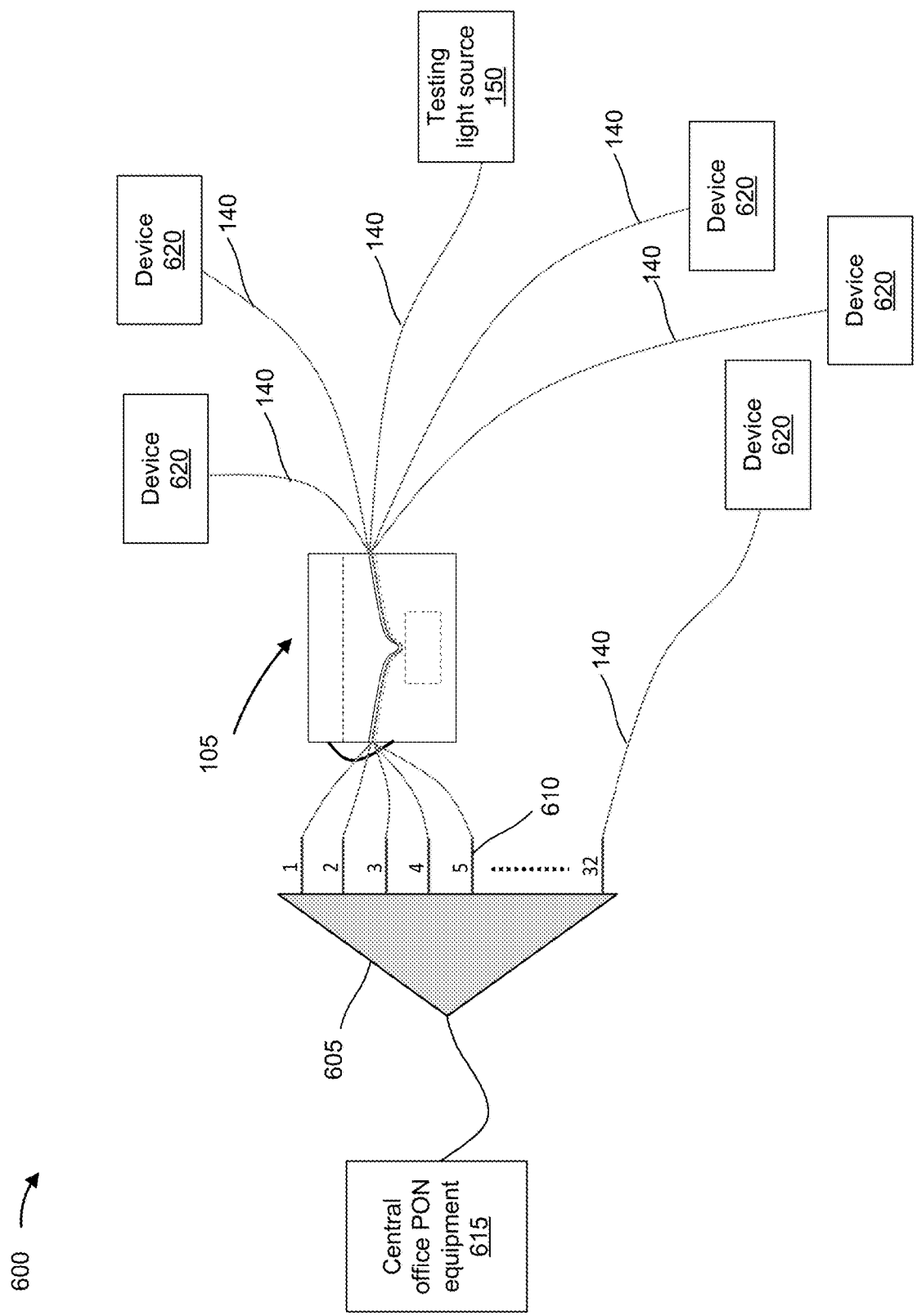
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include PON testing device 105, testing light source 150, a passive power splitter 605, a central office PON equipment 615, and a plurality of devices 620. As shown in FIG. 6, passive power splitter 605 may be connected to central office PON equipment 615 located at a central office of a service provider. Central office PON equipment 615 may provide optical signals to devices 620 via passive power splitter 605.

As shown in FIG. 6, passive power splitter 605 may include a plurality of ports 610. Each port 610 may be connected to a respective device 620 via a respective fiber optical cable 140. A device 620 may include a transceiver and/or an optical network unit, among other examples. As shown in FIG. 6, testing light source 150 may be connected to a first end of a fiber optic cable 140 and a second end of the fiber optic cable 140 may be connected to a port of passive power splitter 605. Testing light source 150 may be connected to the fiber optic cable 140 to enable PON testing device 105 to identify the port of passive power splitter 605 to which the fiber optic cable 140, as explained herein. As shown in FIG. 6, PON testing device 105 may be provided at a location of passive power splitter 605.

The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of the example component may perform one or more functions described as being performed by another set of devices of the example component.

Figure 7:
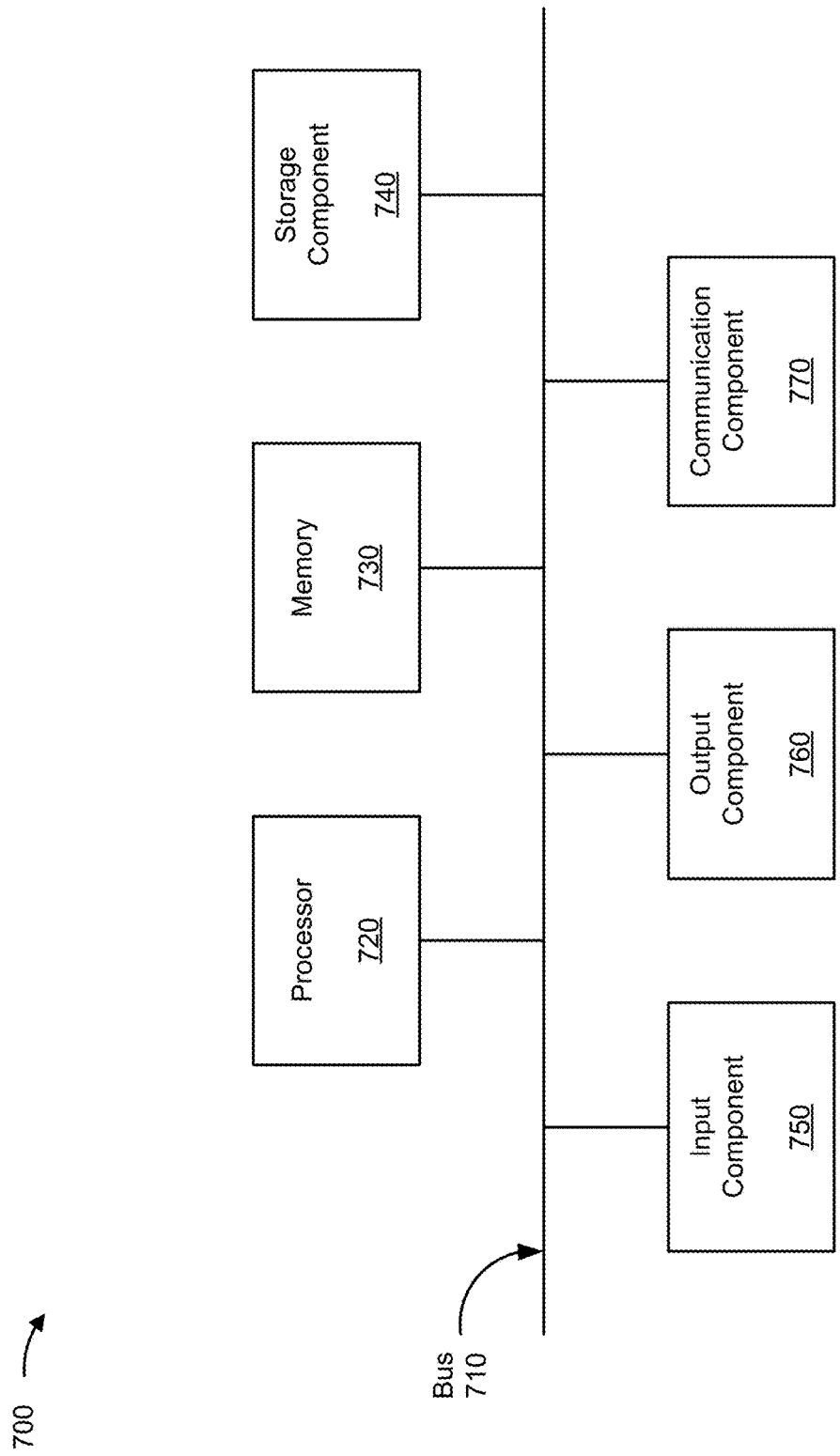
FIG. 7 is a diagram of example components of one or more devices of FIGS. 1-6.

FIG. 7 is a diagram of example components of a device 700, which may correspond to PON testing device 105, testing light source 150, passive power splitter 605, central office PON equipment 615, and/or devices 620. In some implementations, PON testing device 105, testing light source 150, passive power splitter 605, central office PON equipment 615, and/or devices 620 may include one or more devices 700 and/or one or more components of device 700. As shown in FIG. 6, device 700 may include a bus 710, a processor 720, a memory 730, a storage component 740, an input component 750, an output component 760, and a communication component 770.

Bus 710 includes a component that enables wired and/or wireless communication among the components of device 700. Processor 720 includes a central processing unit, a graphics processing unit, a microprocessor, a controller, a microcontroller, a digital signal processor, a field-programmable gate array, an application-specific integrated circuit, and/or another type of processing component. Processor 720 is implemented in hardware, firmware, or a combination of hardware and software. In some implementations, processor 720 includes one or more processors capable of being programmed to perform a function. Memory 730 includes a random access memory, a read only memory, and/or another type of memory (e.g., a flash memory, a magnetic memory, and/or an optical memory).

Storage component 740 stores information and/or software related to the operation of device 700. For example, storage component 740 may include a hard disk drive, a magnetic disk drive, an optical disk drive, a solid state disk drive, a compact disc, a digital versatile disc, and/or another type of non-transitory computer-readable medium. Input component 750 enables device 700 to receive input, such as user input and/or sensed inputs. For example, input component 750 may include a touch screen, a keyboard, a keypad, a mouse, a button, a microphone, a switch, a sensor, a global positioning system component, an accelerometer, a gyroscope, and/or an actuator. Output component 760 enables device 700 to provide output, such as via a display, a speaker, and/or one or more light-emitting diodes. Communication component 770 enables device 700 to communicate with other devices, such as via a wired connection and/or a wireless connection. For example, communication component 770 may include a receiver, a transmitter, a transceiver, a modem, a network interface card, and/or an antenna.

Device 700 may perform one or more processes described herein. For example, a non-transitory computer-readable medium (e.g., memory 730 and/or storage component 740) may store a set of instructions (e.g., one or more instructions, code, software code, and/or program code) for execution by processor 720. Processor 720 may execute the set of instructions to perform one or more processes described herein. In some implementations, execution of the set of instructions, by one or more processors 620, causes the one or more processors 620 and/or the device 700 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 7 are provided as an example. Device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
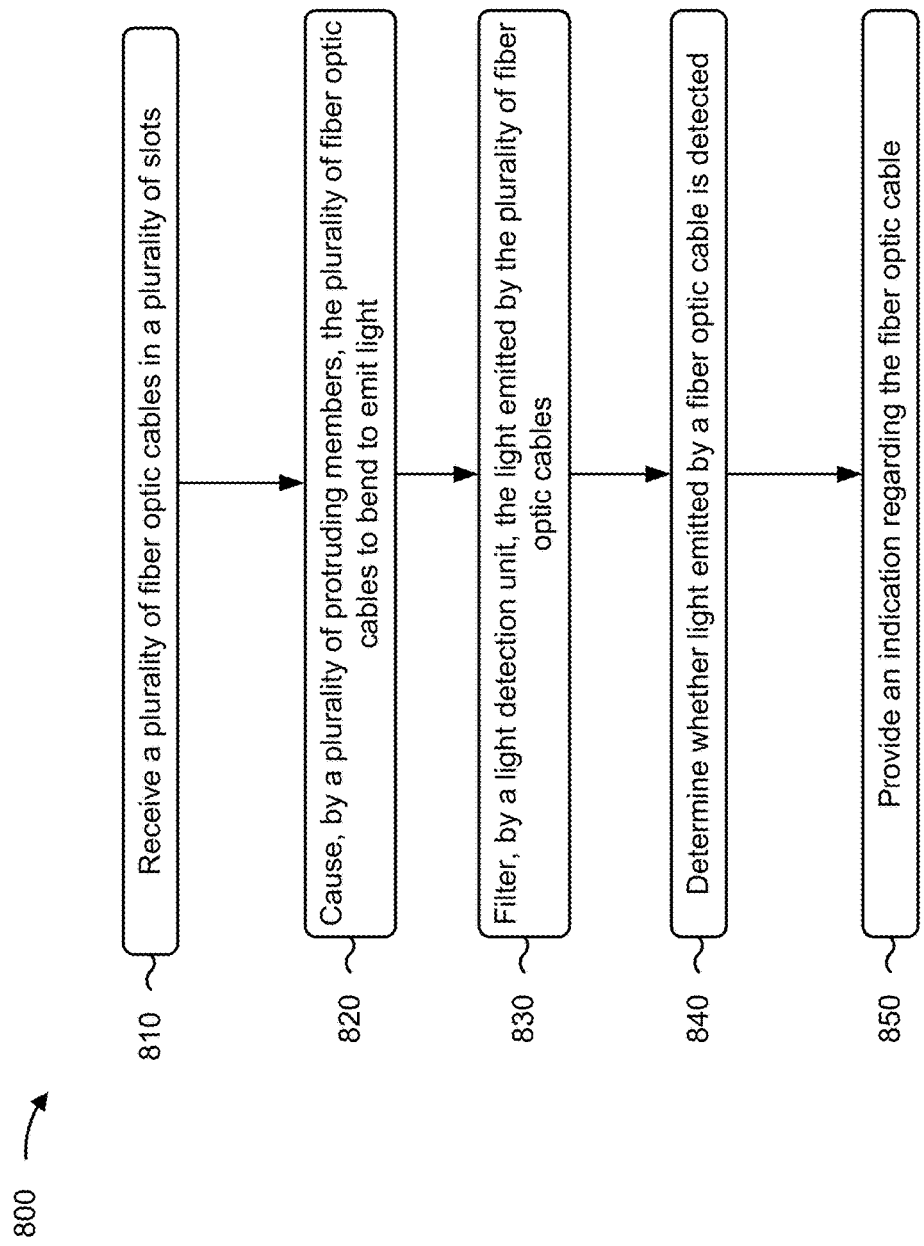
FIG. 8 is a flowchart of an example process relating to preventing service interruption when troubleshooting a PON.

FIG. 8 is a flowchart of an example process 800 relating to preventing service interruption when troubleshooting a PON. In some implementations, one or more process blocks of FIG. 8 may be performed by a PON testing device (e.g., a PON testing device). In some implementations, one or more process blocks of FIG. 8 may be performed by another device or a group of devices separate from or including the PON testing device, such as testing light source (e.g., testing light source 150) and/or passive power splitter 605 (e.g., passive power splitter 605). Additionally, or alternatively, one or more process blocks of FIG. 8 may be performed by one or more components of device 700, such as processor 720, memory 730, storage component 740, input component 750, output component 760, and/or communication component 770.

As shown in FIG. 8, process 800 may include receiving a plurality of fiber optic cables in a plurality of slots (block 810). For example, the PON testing device may receive a plurality of fiber optic cables in a plurality of slots of the PON testing device. In some implementations, each fiber optic cable, of the plurality of fiber optic cables, is received in a respective slot of the plurality of slots, as described above. In some implementations, each fiber optic cable, of the plurality of fiber optic cables, is received in a respective slot of the plurality of slots.

In some implementations, each of the plurality of fiber optic cables is connected to a respective port of a plurality of ports of a passive power splitter, and wherein providing the indication regarding the fiber optic cable comprises providing an indication regarding a port of the plurality of ports, wherein the fiber optic cable is connected to the port.

As further shown in FIG. 8, process 800 may include causing, by a plurality of protruding members, the plurality of fiber optic cables to bend to emit light (block 820). For example, the PON testing device may cause the plurality of fiber optic cables to bend, in the plurality of slots, to emit light, as described above.

In some implementations, causing the plurality of fiber optic cables to bend comprises causing the plurality of protruding members to be moved toward the plurality of slots.

As further shown in FIG. 8, process 800 may include filtering, by a light detection unit, the light emitted by the plurality of fiber optic cables (block 830). For example, the PON testing device may filter the light emitted by the plurality of fiber optic cables, as described above.

In some implementations, process 800 includes filtering the light emitted by the plurality of fiber optic cables comprises filtering the light, emitted by the plurality of fiber optic cables, based on a wavelength of light of a testing light source.

As further shown in FIG. 8, process 800 may include determining whether light emitted by a fiber optic cable is detected (block 840). For example, the PON testing device may determine whether light emitted by a fiber optic cable, of the plurality of fiber optic cables, is detected after filtering the light emitted by the plurality of fiber optic cables, as described above.

As further shown in FIG. 8, process 800 may include providing an indication regarding the fiber optic cable (block 850). For example, the PON testing device may provide an indication regarding the fiber optic cable based on determining that the light emitted by the fiber optic cable is detected, as described above.

In some implementations, the PON testing device includes a plurality of light sources, wherein each light source, of the plurality of light sources, is associated with a respective slot of the plurality of slots, wherein the fiber optic cable is received in a slot of the plurality of slots, and wherein providing the indication regarding the fiber optic cable comprises causing a light source, associated with the slot, to emit light based on determining that the light emitted by the fiber optic cable is detected.

In some implementations, the PON testing device includes a plurality of light sources, wherein each light source, of the plurality of light sources, is associated with a respective slot of the plurality of slots, wherein the fiber optic cable is received in a slot of the plurality of slots, and wherein the method further comprises causing a light source, associated with the slot, to emit light of a first color based on determining that the light emitted by the fiber optic cable is detected, and causing the light source, associated with the slot, to emit light of a second color based on determining that the light emitted by the fiber optic cable is not detected, Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
    a first portion comprising a plurality of slots configured to receive a plurality of fiber optic cables,
        wherein each fiber optic cable, of the plurality of fiber optic cables, is connected to a respective port of a plurality of ports of a passive power splitter, and
        wherein each fiber optic cable, of the plurality of fiber optic cables, is received in a respective slot of the plurality of slots;
    a second portion comprising a plurality of protruding members configured to bend the plurality of fiber optic cables, received in the first portion, to cause the plurality of fiber optic cables to emit light, and
    a light detection unit comprising a plurality of light sources,
        wherein each light source, of the plurality of light sources, is associated with a respective slot of the plurality of slots, and
        wherein the light detection unit is configured to:
            determine whether light emitted by a fiber optic cable of the plurality of fiber optic cables is detected; and
            provide an indication regarding a port of the plurality of ports based on determining that the light, emitted by the fiber optic cable, is detected,
            wherein the fiber optic cable is connected to the port.

2. The device of claim 1,
    wherein the fiber optic cable is received in a slot of the plurality of slots.

3. The device of claim 2, wherein the light detection unit is further configured to:
    cause a light source of the plurality of light sources, associated with the slot, to emit light of a first color based on determining that the light emitted by the fiber optic cable is detected; and cause the light source, associated with the slot, to emit light of a second color when the light emitted by the fiber optic cable is not detected,
wherein the second color is different than the first color.

4. The device of claim 3, wherein the light detection unit further comprises:
a power source; and
a processor configured to cause the light source to emit the light of the first color or the light of the second color.

5. The device of claim 1, wherein the light detection unit, to determine whether the light is detected, is configured to:
filter light emitted by the plurality of fiber optic cables; and
determine whether the light, emitted by the fiber optic cable, is detected after filtering the light emitted by the plurality of fiber optic cables.

6. The device of claim 5, wherein the light detection unit, to filter the light emitted by the plurality of fiber optic cables, is configured to:
filter the light emitted by the plurality of fiber optic cables based on a wavelength of light of a testing light source.

7. The device of claim 6, wherein the light detection unit comprises an optical filter configured based on the wavelength of light of the testing light source, and
wherein the light detection unit, to filter the light emitted by the plurality of fiber optic cables, is configured to:
filter the light emitted by the plurality of fiber optic cables using the optical filter.

8. A method performed by a passive optical network (PON) testing device, the method comprising:
receiving a plurality of fiber optic cables in a plurality of slots of the PON testing device,
wherein each fiber optic cable, of the plurality of fiber optic cables, is received in a respective slot of the plurality of slots,
wherein the PON testing device includes a plurality of light sources, and
wherein each light source, of the plurality of light sources, is associated with a respective slot of the plurality of slots;
causing, by a plurality of protruding members of the PON testing device, the plurality of fiber optic cables to bend, in the plurality of slots, to emit light;
filtering, by a light detection unit of the PON testing device, the light emitted by the plurality of fiber optic cables;
determining, by the light detection unit, whether light emitted by a fiber optic cable, of the plurality of fiber optic cables, is detected after filtering the light emitted by the plurality of fiber optic cables; and
providing, by the light detection unit, an indication regarding the fiber optic cable based on determining that the light emitted by the fiber optic cable is detected.

9. The method of claim 8, wherein each of the plurality of fiber optic cables is connected to a respective port of a plurality of ports of a passive power splitter, and
wherein providing the indication regarding the fiber optic cable comprises:
providing an indication regarding a port of the plurality of ports,
wherein the fiber optic cable is connected to the port.

10. The method of claim 8, wherein filtering the light emitted by the plurality of fiber optic cables comprises:
filtering the light, emitted by the plurality of fiber optic cables, based on a wavelength of light of a testing light source.

11. The method of claim 8,
wherein the fiber optic cable is received in a slot of the plurality of slots, and
wherein providing the indication regarding the fiber optic cable comprises:
causing a light source, associated with the slot, to emit light based on determining that the light emitted by the fiber optic cable is detected.

12. The method of claim 8, wherein causing the plurality of fiber optic cables to bend comprises:
causing the plurality of protruding members to be moved toward the plurality of slots.

13. The method of claim 8,
wherein the fiber optic cable is received in a slot of the plurality of slots, and
wherein the method further comprises:
causing a light source, associated with the slot, to emit light of a first color based on determining that the light emitted by the fiber optic cable is detected; and
causing the light source, associated with the slot, to emit light of a second color based on determining that the light emitted by the fiber optic cable is not detected,
wherein the second color is different than the first color.

14. A system comprising:
a testing light source configured to emit test light and to be connected to one of a plurality of fiber optic cables,
wherein each fiber optic cable, of the plurality of fiber optic cables, is connected to a respective port of a plurality of ports of a passive power splitter; and
a passive optical network (PON) testing device comprising:
a first portion comprising a plurality of slots configured to receive the plurality of fiber optic cables,
wherein each fiber optic cable, of the plurality of fiber optic cables, is received in a respective slot of the plurality of slots;
a second portion comprising a plurality of protruding members configured to bend the plurality of fiber optic cables, received in the first portion, to cause the plurality of fiber optic cables to emit light; and
a light detection unit comprising a plurality of light sources,
wherein each light source, of the plurality of light sources, is associated with a respective slot of the plurality of slots, and
wherein the light detection unit is configured to:
determine whether the light, emitted by a particular fiber optic cable of the plurality of fiber optic cables, is the test light, and
provide an indication regarding a particular port of the plurality of ports based on determining that the light, emitted by the particular fiber optic cable, is the test light,
wherein the particular fiber optic cable is connected to the particular port.

15. The system of claim 14, wherein the first portion, of the PON testing device, is connected to the second portion, of the PON testing device, via a hinge.

16. The system of claim 14, wherein the testing light source is configured to be connected to a first end of the particular fiber optic cable when the particular port is experiencing a failure,
wherein the first end of the particular fiber optic cable is provided at a location that is remote with respect to a location of the passive power splitter, wherein a second end of the particular fiber optic cable is connected to the passive power splitter, and wherein the light detection unit is configured to determine that the light, emitted by the particular fiber optic cable, is the test light when the testing light source is connected to the first end of the particular fiber optic cable.

17. The system of claim 14, wherein the particular fiber optic cable is received in a particular slot of the plurality of slots.

18. The system of claim 17, wherein the light detection unit is further configured to:

cause a light source of the plurality of light sources, associated with the particular slot, to emit light of a first color based on determining that the light emitted by the particular fiber optic cable is the test light; and cause the light source, associated with the particular slot, to emit light of a second color based on determining that the light emitted by the particular fiber optic cable is not the test light, wherein the second color is different than the first color.

19. The system of claim 18, wherein the light detection unit further comprises:

a power source; and a processor configured to cause the light source to emit the light of the first color or the light of the second color.

20. The system of claim 14, wherein the light detection unit, to determine whether the light is the test light, is configured to:

filter the light emitted by the plurality of fiber optic cables using a filter, wherein the filter is configured based on a wavelength of the test light; and determine whether the light, emitted by the particular fiber optic cable, is the test light after filtering the light emitted by the plurality of fiber optic cables.

* * * * *